Sept. 17, 1963     H. H. KOEPPE     3,103,861
PRESSURE PLATE ASSEMBLY FOR CAMERAS OR MAGAZINES
Filed Dec. 18, 1959     2 Sheets-Sheet 1
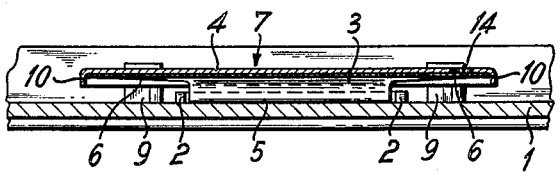
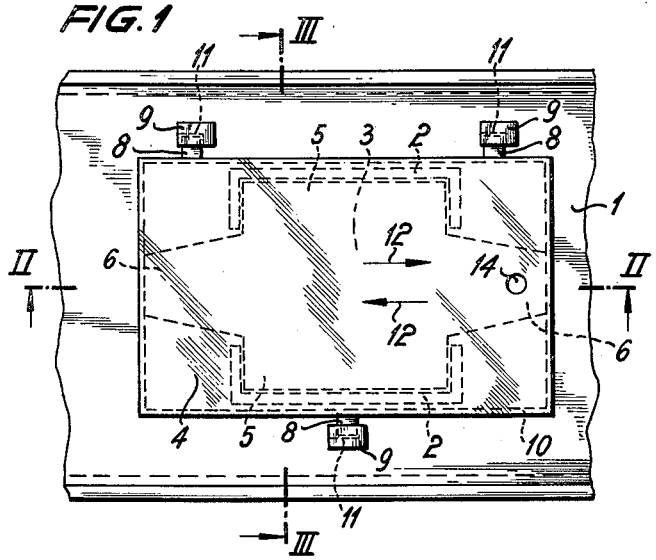
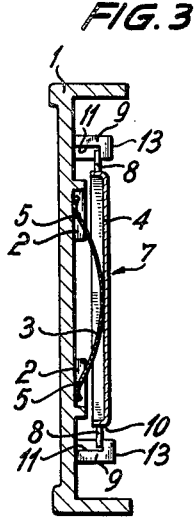
INVENTOR
Hans Hermann Koeppe Sept. 17, 1963  H. H. KOEPPE  3,103,861
PRESSURE PLATE ASSEMBLY FOR CAMERAS OR MAGAZINES
Filed Dec. 18, 1959  2 Sheets-Sheet 2
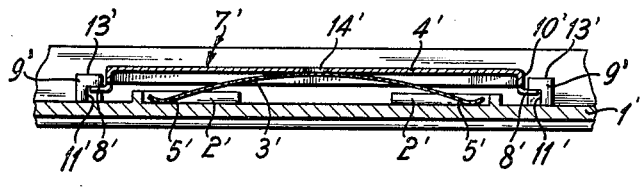
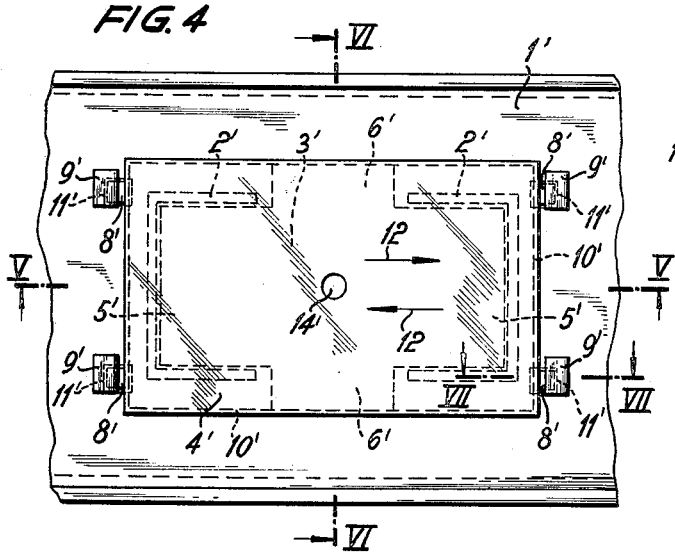
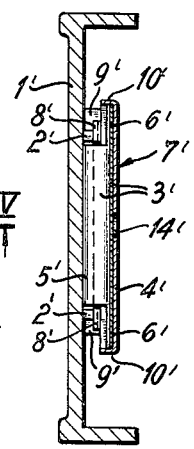
INVENTOR
Hans Hermann Koeppe
by Michael S. Striker
his attorney United States Patent Office 3,103,861
Patented Sept. 17, 1963

3,103,861
PRESSURE PLATE ASSEMBLY FOR CAMERAS OR MAGAZINES
Hans Hermann Koeppe, Wiesbaden, Germany, assignor to Adox Kamerawerk G.m.b.H., Wiesbaden-Biebrich, Germany
Filed Dec. 18, 1959, Ser. No. 860,478
Claims priority, application Germany Dec. 19, 1958
10 Claims. (Cl. 95—31)

This present invention relates to cameras.

More particularly, the present invention relates to pressure plate assemblies which are adapted to be used in cameras either as a part of the camera itself or as a part of a magazine which is temporarily placed within a camera.

Pressure plate assemblies are of course well known, but conventional pressure plate assemblies suffer from several defects. Thus, many types of conventional pressure plate assemblies require such elements as screws, nuts, rivets, and the like in order to fasten not only the pressure plate to a leaf spring or the like but also the leaf spring itself to a wall of the camera or magazine, and the use of such fasteners greatly increases the cost of the construction not only with respect to the number of parts required but also with respect to the labor required to assemble and disassemble the parts. There are also certain types of pressure plate assemblies where fasteners of this type are not used, but in such pressure plate assemblies it is impossible to assemble and disassemble the parts without the likelihood of permanent deformation of either the leaf spring or the pressure plate unless extreme care and just the right tools are used for this purpose, so that here again there is an extreme inconvenience with respect to the assembly and disassembly of the components.

One of the objects of the present invention is to provide a pressure plate assembly of the above type which requires absolutely no fasteners such as screws, nuts, rivets, or the like, and which at the same time is capable of being very quickly and easily assembled and disassembled without running the risk of any possible deformation of any of the components of the assembly.

It is also an object of the present invention to provide an exceedingly simple and inexpensive structure which will operate very reliably to produce the desired results.

With the above objects in view the present invention includes in a pressure plate assembly for a camera or a magazine a wall against one face of which a leaf spring member is located. A means is carried by the wall and cooperates with the leaf spring member to prevent movement of the latter in a first pair of opposed directions along the face of the wall which is engaged by the leaf spring member. A pressure plate member is carried by the leaf spring member and is supported by the latter for resilient yieldable movement toward and away from the wall and a means cooperates with these members to prevent movement of the latter one with respect to the other also in said first pair of opposed directions. The wall carries a means which cooperates with one of the above members to prevent movement of this one member in a second pair of opposed directions which are perpendicular to the first pair of opposed directions.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a fragmentary elevation of a wall of a camera or magazine shown in FIG. 1 connected with and forming part of the structure of the invention;

FIG. 2 is a section taken along line II—II of FIG. 1;

FIG. 3 is a sectional elevation taken along line III—III of FIG. 1;

FIG. 4 is a fragmentary elevation of a wall connected with and carrying a second embodiment of the invention of which the wall also forms a part;

FIG. 5 is a sectional elevation taken along line V—V of FIG. 4;

FIG. 6 is a sectional elevation taken along line VI—VI of FIG. 4; and

FIG. 7 is a fragmentary sectional view taken along line VII—VII of FIG. 4 in the direction of the arrows.

Referring now to FIGS. 1–3, there is shown therein a pressure plate assembly according to the invention, this assembly including a wall 1 which may be either the rear wall of a camera or the rear wall of a magazine which is adapted to be introduced into a camera. This wall 1 fixedly carries at its inner face a means in the form of a pair of U-shaped ribs 2, these ribs forming a means which cooperates with a leaf spring 3 to prevent movement of the latter in at least at a first pair of opposed directions extending to the right and left, as viewed in FIG. 1. This leaf spring member 3 has a concave surface directed toward the inner face of the wall 1 and it is provided with a pair of opposed end portions 5 which engage the inner face of the wall 1 and which extend into the spaces enclosed within the U-shaped ribs 2. It will be seen that each of the U-shaped ribs has a pair of legs directed toward and aligned with the pair of legs of the other U-shaped rib. It is apparent that the side edges of each end portion 5 of the leaf spring 3 cooperates with the pair of legs of the rib 2 between which it is located in a manner which prevents movement of the leaf spring 3 to the right or left as viewed in FIG. 1.

The assembly of the invention also includes a pressure plate member 4 which has a continuous flange extending along its entire periphery and directed toward the wall 1, this continuous flange of the pressure plate being formed thereon in a known way and giving the pressure plate a stiffness and rigidity which guarantees that the film-engaging surface 7 of the pressure plate 4 will at all times form a plane. The leaf spring 3 has a second pair of opposed end portions 6 which are spaced from the inner face of the wall 1, and these end portions 6 of the leaf spring 3 respectively engage behind a pair of opposed flange portions of the pressure plate member 4, the latter flange portions extending perpendicularly across the pair of opposed directions indicated by the arrows 12 in FIG. 1, the film itself moving in the direction of the arrows 12 in the particular embodiment shown in FIG. 1. Thus, the end portions 6 of the leaf spring 3 and the right and left flange portions 10 of the plate 4, as viewed in FIG. 1, cooperate to form a means which prevents relative movement of the leaf spring member 3 and the pressure plate member 4 with respect to each other in the pair of opposed directions 12, and it will be noted, as pointed out above, that the legs of the U-shaped ribs 2 also cooperate with the end portions 5 of the leaf spring 3 to prevent movement of the latter along the inner face of the wall 1 in the directions of the arrows 12, so that in this way the ribs 2 form a means preventing movement of the leaf spring 3 in the directions of the arrows 12 while tongues or ends 6 of the leaf spring 3 and the right and left flanges 10 of the pressure plate 4 form a means which also prevents movement of the leaf spring member and the pressure plate member with respect to each other in the opposed direction 12 shown in FIG. 1.

The pressure plate member 4 fixedly carries a plurality of tongues 8 respectively extending from the upper and lower flange portions 10 thereof, as viewed in FIG. 1, and these tongues 8 respectively extend beneath a plurality of angle members 9 which are respectively fixed to the wall 1 at the inner face thereof. These angle members 9 may be, for example, welded or formed integrally with the wall 1, and they are provided with portions 13 spaced from the wall 1 and behind which the tongues 8 extend. It will be noted that the walls of the angle members 9 which are fixed to the wall 1 extend in the direction of the arrows 12 while the walls 13 extend toward the pressure plate, so that in this way spaces 11 are formed into which the tongues 8 extend and the angle members 9 cooperate with the tongues 8 to form a limiting means preventing movement of the pressure plate member 4 with respect to the wall 1 in a pair of opposed directions which are perpendicular to the directions 12 shown in FIG. 1.

It will be noted that in the example illustrated in FIG. 1 the angle members 9 are closed at their right ends, as viewed in FIG. 1, so that they limit movement of the pressure plate 4 to the right, as viewed in FIG. 1, although this latter closing of the angle members 9 is not at all essential and the angle members 9 can have any desired length.

The means formed by the end portions 6 of the spring 3 and the right and left flanges of the plate 4, as viewed in FIG. 1, for preventing relative movement between the leaf spring and the pressure plate in the direction of the arrows 12 is a manually releasable means which can be very easily released so as to permit relative movement between the leaf spring and pressure plate members for assembly and disassembly purposes, and this means is rendered releasable by forming the pressure plate member 4 with an opening 14 shown in FIG. 1 located over the right end portion 6 of the leaf spring member 3. With this arrangement the operator can at any time place the point of a pencil or the like through the opening 14 to push the right end portion 6 of the leaf spring member 3 from behind the right flange 10 of FIG. 1, and now it will be possible to shift the pressure plate member 4 to the left, as viewed in FIG. 1, away from the leaf spring member 3 which itself can be easily removed from the wall 1 as soon as the pressure plate member 4 is removed from the leaf spring member 3. In order to reassemble the parts it is only necessary after the end portions 5 of the leaf spring member 3 are placed within the U-shaped ribs 2, to slip the pressure plate member 4 to the right, as viewed in FIG. 1, along leaf spring 3 moving the tongues 8 beneath the angle members 9 until the right end portion 6 of the leaf spring member 3, as viewed in FIG. 1, snaps behind the right flange 10 of the pressure plate member 4 as viewed in FIG. 1, and now the parts are assembled. It will be noted that because the angle members 9 are closed at their right ends, as viewed in FIG. 1, the pressure plate member 4 can only be removed from the leaf spring member 3 by being moved with respect to the latter to the left, as viewed in FIG. 1.

The leaf spring 3 has such dimensions with respect to the pressure plate member 4, and the tongues 8 have such dimensions with respect to the angle members 9, that the pressure plate member 4 is mounted for yieldable resilient play toward and away from the wall 1, the leaf spring member 3 urging the member 4 away from the wall 1 so that the pressure plate member 4 will reliably press the film against the film guides of the camera or magazine and thus will be able to locate the film in the focal plane.

In the embodiment of the invention which is illustrated in FIGS. 4–7, the substantially U-shaped ribs 2' are displaced through 90° with respect to the corresponding ribs of FIGS. 1–3 and the leaf spring member 3' has its end portions 5' cooperating with these ribs in the same way. The end portions 6' with this embodiment cooperate with the upper and lower flanges 10' which is to say the longer flanges of the rectangular pressure plate member 4' of FIGS. 4–6, and the tongues 8' extend from the right and left flanges 10' beneath the outer walls of four angle members 9' in this embodiment. It will be noted that all of these angle members 9' of FIG. 4 are closed at their upper ends so that they prevent movement of the pressure plate member 4' upwardly beyond the position shown in FIG. 4, and in this embodiment it is the angle members 9' which cooperate with the tongues 8' to prevent movement of the pressure plate member 4' in the pair of opposed directions 12 in which the film strip moves. The tongues or ends 6' of the leaf spring 3' cooperate with the upper and lower flanges 10' of the pressure plate 4' to prevent relative movement between the pressure plate member 4' and the leaf spring member 3' in a pair of opposed directions which are perpendicular to the directions 12 shown in FIG. 4.

Of course, with the embodiment of FIG. 4 the angle members 9' are located directly behind the film and in order to prevent engagement of the film with these angle members 9 they are made much shallower than the angle members 9 of FIG. 1 and in the embodiment of FIG. 4 the tongues 8' are offset with respect to the remainder of the pressure plate 4' so as to be located much nearer to the inner surface of the wall 1' and thus the tongues 8' can cooperate with the angle members 9' which in this event have such a small depth that they will not engage the film while the spring 3 is compressed and the surface 7' of the pressure plate member 4' is in engagement with the film. It should be noted, that although the angle members 9' have a lesser depth than the corresponding members 9 of FIG. 1 nevertheless there is plenty of yieldable resilient play of the tongues 8' toward and away from the wall 1 so as to permit the pressure plate member 4' to operate properly with respect to the film.

It will also be noted that in the embodiment of FIGS. 4–7 the opening 14' is located at the center of the pressure plate member 4' so that when a pencil or the like is pushed through the opening 14' into engagement with the leaf spring member 3' both of the end portions 6' thereof may move out of engagement with the upper and lower flanges 10' of FIG. 4, but of course with this embodiment also since the angle members 9' are closed at their upper ends, as viewed in FIG. 4, the pressure plate member 4' can only be disassembled by being moved downwardly with respect to the leaf spring member 3', as viewed in FIG. 4.

In the embodiment of FIGS. 4–7 also it is not essential to close the angle members 9' at their upper ends, as viewed in FIG. 4, and these angle members 9' may have any desired length.

It will be understood that each of the elements described above, or two or more together, may also find a useful application in other types of cameras differing from the types described above.

While the invention has been illustrated and described as embodied in pressure plate assemblies, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a pressure plate assembly for cameras or magazines, in combination, a wall; a leaf spring member located against one face of said wall; means carried by said wall and co-operating with said leaf spring member for preventing movement of the latter along said face of said wall in a first pair of opposed directions, but permitting movement of said leaf spring member relative to said wall in at least one other direction for separating said leaf spring member from said wall; a pressure plate member engaged and supported by said leaf spring member for yieldable movement toward and away from said face of said wall; disengageable locking means co-operating with said members for preventing, when engaged, movement of the same with respect to each other in said first pair of opposed directions; and limiting means carried by said wall at said one face thereof and co-operating with said pressure plate member to prevent movement of said pressure plate member in a second pair of opposed directions along said face of said wall perpendicular to said first pair of opposed directions, said limiting means limiting movement of said pressure plate member in said other direction relative to said wall for holding said pressure plate member and said leaf spring member assembled with each other and with said wall, said pressure plate member when moved, after disengagement of said disengageable locking means, in one of said first pair of opposed directions becoming separated from said limiting means and thus from said wall to free said leaf spring for movement in said other direction to be separated from said wall.

2. In a pressure plate assembly as recited in claim 1, said disengageable locking means being manually operable.

3. In a pressure plate assembly as recited in claim 1, said pressure plate member having a pair of flanges respectively located at opposite ends of said pressure plate member and extending transversely of said first pair of opposed directions from said pressure plate member toward said wall, said leaf spring member having a pair of opposed end portions respectively engaged behind said flanges so that said end portions of said leaf spring member and said flanges co-operate to prevent movement of said members with respect to each other in said first pair of opposed directions, said end portions of said leaf spring member and said flanges of said pressure plate member forming said disengageable locking means, one of said end portions of said leaf spring member when displaced from behind one of said flanges disengaging said locking means.

4. In a pressure plate assembly as recited in claim 1, said means which is carried by said wall and co-operates with said leaf spring member for preventing movement of the latter along said face of said wall in said first pair of opposed directions also co-operating with said leaf spring member for preventing movement of the latter in said second pair of opposed directions.

5. In a pressure plate assembly for cameras or magazines, in combination, a wall; a leaf spring member located against one face of said wall; means carried by said wall and co-operating with said leaf spring member for preventing movement of the latter along said face of said wall in one direction but permitting movement of said leaf spring member relative to said wall in at least one other direction for separating said leaf spring member from said wall; a pressure plate member engaged and supported by said leaf spring member for yieldable movement toward and away from said face of said wall; limiting means carried by said wall at said one face thereof and co-operating with said pressure plate member for preventing movement thereof in said other direction while permitting its movement in said one direction so as to be separated from said wall by such movement in said one direction; and disengageable locking means co-operating with said members for preventing, when engaged, movement of the same with respect to each other in said one direction but permitting, when disengaged, movement of said pressure plate relative to said leaf spring member and said wall so as to be separated from said limiting means for removal from said leaf spring member and said wall in said one direction, whereby after such removal of said pressure plate member said leaf spring member is free to be moved in said other direction to be separated from said wall.

6. In a pressure plate assembly for cameras or magazines, in combination, a wall; a leaf spring member engaging said wall at one face thereof; means carried by said wall and cooperating with said leaf spring member for preventing movement of the latter along said face of said wall in a first pair of opposed directions; a pressure plate member engaging and supported by said leaf spring member for yieldable resilient movement toward and away from said one face of said wall, said pressure plate member having a pair of flanges respectively located at opposite ends of said pressure plate member and extending transversely of said first pair of opposed directions from said pressure plate member toward said wall, said leaf spring having a pair of opposed end portions respectively engaged behind said flanges so that said end portions of said leaf spring and said flanges cooperate to prevent movement of said members with respect to each other in said first pair of opposed directions; said pressure plate being formed with an opening located along a straight line extending between said opposed end portions of said leaf spring so that an instrument may be inserted through said opening to engage said leaf spring and move at least one of said end portions thereof away from behind one of said flanges to release said plate from said leaf spring; and means carried by said wall and cooperating with one of said members to prevent movement thereof along said face of said wall in a second pair of opposed directions perpendicular to said first pair of opposed directions.

7. In a pressure plate assembly for cameras or magazines, in combination, a wall; a leaf spring member engaging said wall at one face thereof; means carried by said wall and cooperating with said leaf spring member for preventing movement of the latter in a first pair of opposed directions along said face of said wall; a pressure plate member engaged and carried by said leaf spring member and supported by the latter for yieldable resilient movement toward and away from said face of said wall; releasable means cooperating with said members to prevent movement thereof with respect to each other in said first pair of opposed directions, said releasable means when released freeing said pressure plate member for movement away from said leaf spring member; and means carried by said wall and cooperating with said pressure plate member for preventing movement of the latter in a second pair of opposed directions perpendicular to said first pair of opposed directions, said means which prevents movement of said pressure plate member in said second pair of opposed directions also limiting movement of said pressure plate member in one of said first pair of opposed directions so that when said releasable means is released said pressure plate member can move only in the other of said first pair of opposed directions away from said leaf spring member.

8. A pressure plate assembly for cameras or magazines, comprising, in combination, a wall; a leaf spring having a concave surface directed toward a face of said wall and a convex surface directed away from said face of said wall, said leaf spring member having a first pair of opposed end portions engaging said face of said wall and a second pair of opposed end portions spaced from said face of said wall; a plurality of rib portions fixedly carried by said wall at said face thereof and defining areas between which said first pair of opposed end portions of said leaf spring are located, said rib portions cooperating with said first pair of opposed end portions of said leaf spring to prevent movement of the latter in a first pair of opposed directions along said face of said wall; a pressure plate engaged and carried by said convex surface of said leaf spring and having a pair of opposed edges extending transversely with respect to said first pair of opposed directions and respectively having flanges extending from said pressure plate toward said face of said wall, said second pair of opposed end portions of said leaf spring engaging behind said flanges to prevent relative movement between said pressure plate and leaf spring in said first pair of opposed directions; at least a pair of tongues extending from and fixed to a second pair of opposed edges of said pressure plate; and a pair of angle members fixedly carried by said wall and beneath which said tongues respectively extend, said angle members cooperating with said tongues to prevent movement of said pressure plate along said face of said wall in a pair of opposed directions perpendicular to said first pair of opposed directions.

9. A pressure plate assembly for cameras or magazines comprising, in combination, a wall; a pair of substantially U-shaped ribs fixedly carried by said wall at one face thereof with a pair of opposed legs of one of said U-shaped ribs extending toward and aligned with a pair of opposed legs of the other of said pair of U-shaped ribs; a leaf spring having a concave surface directed towards the face of said wall and having one pair of opposed end portions engaging said wall and respectively extending into the areas within said U-shaped ribs, the latter cooperating with said leaf spring to prevent movement thereof with respect to said face of said wall in two pairs of opposed mutually perpendicular directions, said leaf spring having a second pair of opposed end portions spaced from said wall; a pressure plate engaging the convex surface of said leaf spring and having a pair of opposed flanges extending toward said wall and behind which the second pair of opposed end portions of said leaf spring extend, respectively, said pressure plate having between said flanges a pair of opposed side edges from which at least a pair of tongues respectively extend; and a pair of angle members respectively fixed to said face of said wall and beneath which said tongues extend, said angle members cooperating with said tongues to prevent movement of said plate with respect to said wall in a pair of opposed directions substantially parallel to said flanges.

10. A pressure plate assembly for cameras or magazines comprising, in combination, a wall; a pair of substantially U-shaped ribs fixedly carried by said wall at one face thereof with a pair of opposed legs of one of said U-shaped ribs extending toward and aligned with a pair of opposed legs on the other of said pair of U-shaped ribs; a leaf spring having a concave surface directed towards the face of said wall and having one pair of opposed end portions engaging said wall and respectively extending into the areas within said U-shaped ribs, the latter cooperating with said leaf spring to prevent movement thereof with respect to said face of said wall in two pairs of opposed mutually perpendicular directions, said leaf spring having a second pair of opposed end portions spaced from said wall; a pressure plate engaging the convex surface of said leaf spring and having a pair of opposed flanges extending toward said wall and behind which the second pair of opposed end portions of said leaf spring extend, respectively, said pressure plate having between said flanges a pair of opposed side edges from which at least a pair of tongues respectively extend; and a pair of angle members respectively fixed to said face of said wall and beneath which said tongues extend, said angle members cooperating with said tongues to prevent movement of said plate with respect to said wall in a pair of opposed directions substantially parallel to said flanges, said tongues being offset with respect to said pressure plate and located nearer to said wall than the remainder of said pressure plate.

References Cited in the file of this patent
UNITED STATES PATENTS 2,126,341 Nagel _____ Aug. 9, 1938
2,903,953 Meixner _____ Sept. 15, 1959

FOREIGN PATENTS 813,808 Germany _____ Sept. 17, 1951